H. PARSONS.
AUTOMOBILE TIRE.
APPLICATION FILED APR. 8, 1907.

921,151.

Patented May 11, 1909.

Inventor
Herman Parsons

Witnesses

By Geo. S. Vashon

Bernard P. Vashon.

Attorney

UNITED STATES PATENT OFFICE.

HERMAN PARSONS, OF DEER LODGE, MONTANA.

AUTOMOBILE-TIRE.

No. 921,151.          Specification of Letters Patent.          Patented May 11, 1909.

Application filed April 8, 1907. Serial No. 367,037.

*To all whom it may concern:*

Be it known that I, HERMAN PARSONS, a citizen of the United States, residing at Deer Lodge, in the county of Powell and State of Montana, have invented new and useful Improvements in Automobile-Tires, of which the following is a specification.

This invention relates to automobile tires.

The object of the invention is in a ready and practical manner to prevent escape of air from the entire tire; in case of puncture, to retain the air in segregated cells, whereby should one cell become punctured the remaining ones will be intact and thus serve effectually to cushion the tire; to provide novel means for securing the rapid filling of all of the cells of the tire; to preclude the possibility of creeping of the tire upon the rim; to shield the filling channel or duct against liability of damage or injury in use; generally to improve and increase the efficiency of such tires.

Generally stated, the invention resides in a tire comprising a tube divided by curved or other appropriately shaped partitions into a plurality of cells, each of which contains a valve that will permit ingress of air to the cell, but which will preclude the escape of air therefrom. The air inlets to the respective cells communicate with a continuous air channel that is formed in that portion of the tire that contacts with the rim, said portion being thickened or reinforced for the double purpose of shielding such air channel and of preventing the tire from creeping upon the rim, or riding thereon with attending danger of becoming cut and thus rendered useless.

The invention consists further in certain novel details of construction of automobile tire as will be hereinafter described and claimed.

Figure 1:
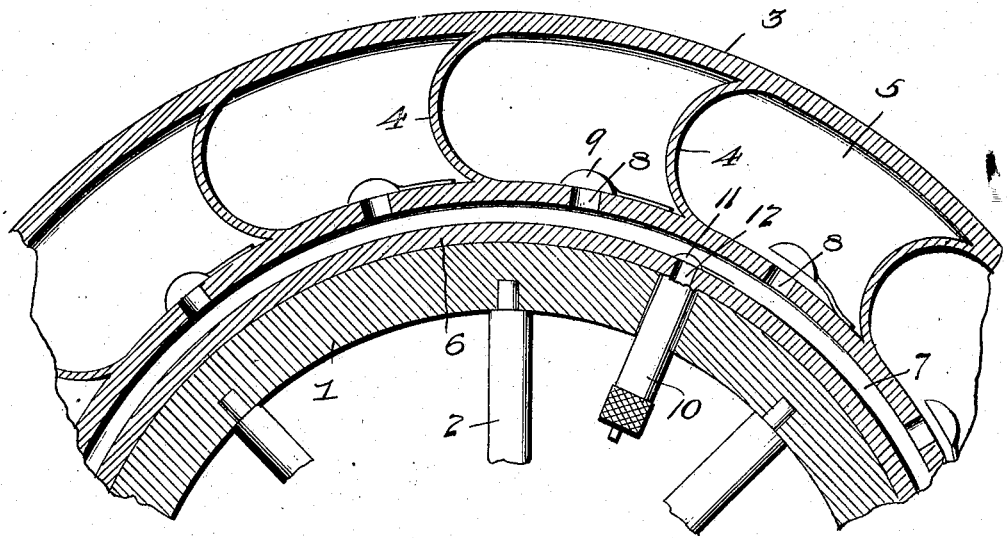
Figure 2:
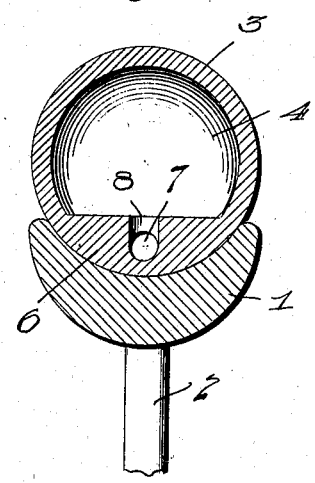

In the accompanying drawings forming a part of the specification and in which like characters of reference indicate corresponding parts, Figure 1 is a view in vertical longitudinal section through a portion of a tire and a rim, the tire being constructed in accordance with the present invention. Fig. 2 is a view in transverse section.

Referring to the drawings, 1 designates the rim and 2 the spokes of an ordinary or any preferred form of wheel, and as these parts may be of any preferred construction, detailed description thereof is deemed unnecessary.

The invention resides in the novel form of tire which may be constructed in any preferred manner to insure elasticity and durability. The tire 3 is divided by a plurality of partitions 4, which are herein shown as dished, into as many air cells or chambers 5 as may be desired, the contour of the partitions operating to reinforce the tire as a whole, and also materially to increase its elasticity, while at the same time, providing the air chambers referred to. The rim portion 6 of the tire is, as shown in Fig. 2, reinforced and thickened, for the purpose of increasing the stability of the tire, and to prevent creeping and riding of the tire upon the rim. This rim portion 6 is provided with an air supply channel 7, which, as clearly shown in Fig. 2 is so housed as to be protected against liability of damage in use, whereby the utility of the tire is materially increased. The outer wall of the air channel is provided with as many orifices 8 as there are air cells, and each of the orifices communicates with a cell or chamber as shown in Fig. 2. In order to retain the air within the cells, each is provided with a flap valve 9 of any preferred construction that is adapted tightly to fit over the orifices 8 and thus seal it in such manner as to hold the air within the chamber under the pressure to which the tire will be subjected in use.

The rim is provided with an ordinary valved inlet tube 10 that communicates with the air channels 7, a valve 11 arranged within the channel operating to seal the opening 12 between the inlet tube 10 and the air channel.

From the construction herein described, it will be seen that a tire possessing all of the necessary requisites to render it thoroughly efficient in use is provided and further that flattening by leakage of air is positively precluded, as, if one or more cells or chambers 5 are punctured, only this portion of the tire will become flattened, while the remaining portion will still retain its required elasticity. Furthermore, in the event of puncture of one or more air chambers, those on each side of it will operate in a large measure to prevent undue flattening.

What I claim is:

A tire for automobiles or the like, provided with a thickened rim engaging portion having a continuous air channel formed therein, and a tread portion the interior of which is provided with a plurality of dished reinforcing members which are spaced apart to provide independent chambers each of which have an independent valve controlled communication with said continuous air channel.

In testimony whereof, I affix my signature in presence of two witnesses.

HERMAN PARSONS.

Witnesses:
   RAY A. GRIFFITH,
   H. W. MATTESON.